(12) United States Patent  (10) Patent No.: US 8,315,914 B2
Bryant et al.  (45) Date of Patent: Nov. 20, 2012

(54) SYSTEMS AND METHODS FOR AUTOMATED MASS MEDIA COMMERCE

(75) Inventors: Barry Bryant, Denville, NJ (US); Paul Staudt, Morristown, NJ (US)

(73) Assignee: TTN Holdings, LLC, New York, NY (US)

( * ) Notice: Subject to any disclaimer, the term of this patent is extended or adjusted under 35 U.S.C. 154(b) by 0 days.

(21) Appl. No.: 13/172,122

(22) Filed: Jun. 29, 2011

(65) Prior Publication Data

US 2011/0320247 A1    Dec. 29, 2011

Related U.S. Application Data

(63) Continuation of application No. 12/780,053, filed on May 14, 2010, now Pat. No. 7,991,644, which is a continuation of application No. 10/987,823, filed on Nov. 12, 2004, now Pat. No. 7,739,150.

(60) Provisional application No. 60/552,472, filed on Mar. 12, 2004.

(51) Int. Cl.
*G06Q 30/00*  (2006.01)
(52) U.S. Cl. .................................................. 705/26.1
(58) Field of Classification Search .................. 705/26.1
See application file for complete search history.

(56) References Cited

U.S. PATENT DOCUMENTS

| | | | |
|---|---|---|---|
| 5,971,277 | A | 10/1999 | Cragun et al. |
| 6,435,406 | B1 | 8/2002 | Pentel |
| 6,535,726 | B1 | 3/2003 | Johnson |
| 6,577,861 | B2 | 6/2003 | Ogasawara |
| 2002/0094787 | A1 | 7/2002 | Avnet et al. |
| 2002/0138347 | A1 | 9/2002 | Sakata |
| 2002/0156677 | A1 | 10/2002 | Peters et al. |
| 2002/0169686 | A1 | 11/2002 | Zweben et al. |
| 2002/0169714 | A1 | 11/2002 | Ike et al. |
| 2003/0006911 | A1 | 1/2003 | Smith et al. |
| 2003/0061110 | A1 | 3/2003 | Bodin |
| 2003/0070167 | A1 | 4/2003 | Holtz et al. |
| 2003/0097302 | A1 | 5/2003 | Overhultz et al. |
| 2004/0029569 | A1 | 2/2004 | Kahn et al. |
| 2004/0049451 | A1 | 3/2004 | Berardi et al. |
| 2004/0083170 | A1 | 4/2004 | Bam et al. |
| 2004/0128197 | A1 | 7/2004 | Bam et al. |
| 2004/0158488 | A1 | 8/2004 | Johnson |
| 2004/0172340 | A1 | 9/2004 | Bishop et al. |
| 2004/0186768 | A1* | 9/2004 | Wakim et al. .................. 705/14 |
| 2004/0189635 | A1 | 9/2004 | Hoisko |

OTHER PUBLICATIONS

"Advertising to Track Commericals Digitally; Top U.S. Networks will comply with a system seen as comparable to the bar-scanning code"; Los Angles Times; Business; Business Desk; Aug. 18, 2004.

* cited by examiner

*Primary Examiner* — Mila Airapetian
(74) *Attorney, Agent, or Firm* — Lerner, David, Littenberg, Krumholz & Mentlik, LLP

(57) ABSTRACT

Systems and methods for implementing point of advertising purchasing include using mass media publications configured for or containing service, product or vendor transmittable signals, such as from radio frequency identification tags. In a preferred arrangement, a consumer perceiving an advertisement of the mass media publication may activate a reader in a portable communications device, such as a smart mobile or cellular phone, to receive information from the radio frequency signal associated with the advertisement to identify a vendor, product or service associated with the radio frequency identification. The smart mobile phone or communications device of the consumer may communicate with a system of a vendor across a network to order a product or product information from a system of the vendor over the network by using the information from the radio frequency identification.

29 Claims, 4 Drawing Sheets

SYSTEMS AND METHODS FOR AUTOMATED MASS MEDIA COMMERCE

CROSS REFERENCE TO RELATED APPLICATIONS

This application is a continuation of U.S. application Ser. No. 12/780,053, filed May 14, 2010, which claims the benefit of U.S. application Ser. No. 10/987,823, filed on Nov. 12, 2004, which claims the benefit of the filing date of U.S. Provisional Patent Application No. 60/552,472 filed Mar. 12, 2004, the disclosure of which is hereby incorporated herein by reference.

FIELD OF THE INVENTION

The present invention relates to wireless commerce systems. More particularly, the invention involves a point of advertising wireless commerce system to enable pervasive commerce with mass media publications.

BACKGROUND OF THE INVENTION

Traditionally, vendors of services and product utilize mass media to advertise their products. Thus, a vendor will publish an ad describing service or products in magazines, catalogs, billboards, newspapers, radio or television broadcast publications. The advertisement is aimed at attracting the interest of a potential consumer. However, in order to move beyond the stage of advertising, much effort is required by the consumer.

The consumer typically has to either remember advertised information if any interest in an advertised product or service will be pursued by the consumer. In the situation where an advertisement includes contact information such as a telephone number, a consumer can dial the phone number to contact a vendor from information in the advertisement using a telephone, wireless or cellular phone. But the amount of effort that is required by the consumer from the point of advertisement to consummation of an actual purchase from the vendor can work against the vendor. Consumers can easily forget telephone numbers, URLs or other calls to action or simply lose interest in an advertised product or service as time goes by after the consumer recognizes the advertisements.

SUMMARY OF TEE INVENTION

The invention relates to an automated system for improving the way consumers respond to advertisements or otherwise contact vendors from the point of perceiving an advertisement. In one form, a system for processing a wireless order from a vendor over a network from a mass media publication includes a mass media publication with an advertisement. The mass media publication has a wireless identification transmission signal representing information of the advertisement. In the system, a mobile ordering device comprising a reader receives the wireless identification transmission signal from the mass media publication. The mobile ordering device is also configured to accept input from a consumer, generate a request with information from the wireless identification transmission signal and communicate the request to and receive a response from a vendor system across a network. The system also includes a vendor system for receiving and processing the request of the mobile ordering device across the network, and responding to the request by sending information to the mobile ordering device. The sent information is associated with the wireless identification transmission signal from the mass media publication.

The invention also involves a method for making a wireless order from a consumer to a vendor over a network from a mass media publication. The consumer reviews a mass media publication with a perceivable advertisement. The mass media publication includes a wireless transmission identification signal representing information about a vendor or product associated with the advertisement. The consumer may initiate receipt of the wireless transmission identification signal with a portable communications device configured to receive the wireless transmission identification signal. The consumer may then generate a request for information from a vendor over a wireless link of a communications network with the portable communications device such that the request includes information from the wireless transmission identification signal. The consumer then receives a response to the consumer request from the vendor over the wireless link of the communications network at the portable communications device to get additional information about the product or confirm a purchase made in the request.

The invention also may involve a hand-held apparatus for making a wireless order from a consumer to a vendor over a network from a mass media publication. The apparatus includes a transceiver for transmitting and receiving wireless signals for communicating with a vendor system over a network. The apparatus also includes a reader device configured to read vendor or product information transmitted from a mass media publication containing a radio frequency identifier with the vendor or product, the radio frequency identifier being associated with an advertisement of the mass media publication. A control processor of the apparatus, coupled to the transceiver and reader device, is configured for accepting input by a user of the apparatus to initiate reading of the radio frequency identifier of the mass media publication with the reader device. The control processor further generates a request for information about the vendor or product with the radio frequency identifier and communicates the request to the vendor system with the transceiver. The control processor also controls receiving a response with information from the vendor system.

In another form, the invention includes a method for taking a wireless order from a consumer by a vendor over a network from a mass media publication. A vendor advertises a product or service in a mass media publication. The mass media publication is configured with a radio frequency identifier with information associated with the product or service advertised. The radio frequency identifier is readable by a portable wireless communications device available to a consumer. The vendor configures a vendor system to receive an electronic order from a consumer across a network using the portable wireless communications device. The order is based on a request with information from the radio frequency identifier. The vendor system includes further product or service information associated with the radio frequency identifier. The vendor then can respond to the orders from the consumer by providing the further information to the consumer.

In one form, the mass media publication is a printed publication having at least one radio frequency identification tag for identifying a vendor or product. However, many such identifications or tags may be used for different vendors or products. The mass media publication may also be a billboard, periodical, magazine, mailer or a post card, etc. having one or more radio frequency identifiers or RFID tags. In a preferred form, the mobile ordering or consumer communications device is also a mobile, wireless, cellular and/or "smart" telephone equipped for voice and data communication.

Additional aspects of the invention will be apparent from a review of the drawings, the following disclosure, and the claims.

DETAILED DESCRIPTION

Figure 1:
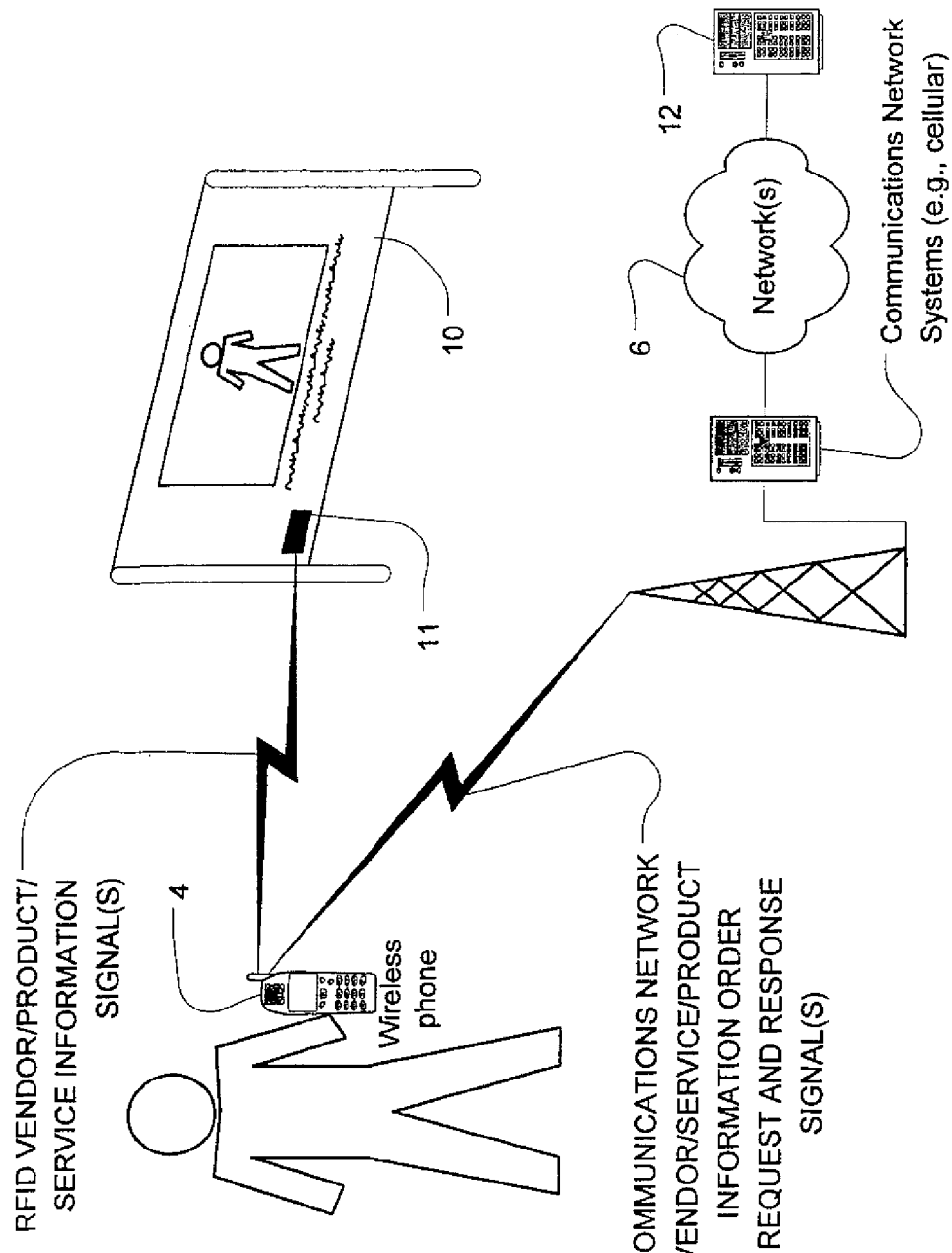
FIG. 1 is a representation of a consumer with a preferred point of advertising wireless ordering device receiving vendor product identification signals transmitted from a billboard mass media publication.

Referring to the figures, where like numerals indicate similar features, a point of advertising ordering system 2 for electronic commerce of the invention typically includes a wireless ordering device 4 that is preferably accessible to a mobile consumer, such as a laptop, hand held or palm computer, a personal data assistant (PDA) or other programmable input/output processing device such as a smart mobile phone, wireless phone or cellular telephone. The consumer accessible point of advertising ordering device 4 is configured for connection or networking to other systems or computers via one or more communications mechanisms for purposes of ordering information or products and services from one or more vendors. While such communication links may in part be implemented as a physical connection such as a telephone line, cable or contact based (e.g., cradle) hook-up, in a preferred embodiment, the ordering device 4 at least includes a communications mechanism that can link the device to other systems via a wireless communications channel.

For example, the device may be configured for Wireless Fidelity (WiFi®) networking (wireless networking), Bluetooth® networking (wireless networking) and/or communications over a mobile telephone network for transmitting data and/or voice with a transceiver (e.g., General Packet Radio Service (GPRS)). Where such networked communications involve transfer of signals or messages over one or more network(s) 6 that includes an open-type network, such as an internet or the Internet, preferably such signals or messages are encrypted. As will be described in more detail herein, the wireless ordering device 4 also preferably includes a reader mechanism for determining vendor, product or service information from a mass media publication 4.

The point of advertising ordering system 2 also includes a mass media publication 10 configured for transmitting product, service and/or vendor information signals associated with an advertisement of the mass media publication 10. Preferably, the mass media publication transmits such information by means of radio frequency identification technology (RFID). For example, RFID technology, such as ultra thin transponder tags 11, may be inserted, applied or incorporated into the mass media publication and associated with a human perceivable advertisement of a vendor, product or service. The RFID includes information to identify a vendor, product and/or service (i.e., commerce information). Preferably, the vendor, product and/or service may also be contained in, presented or described in the advertisement. In the RFID tag example, transmission of vendor, product and/or service information or commerce signals may be active or passive.

The RFID transmission may include a particular number or numbers that may be associated with particular vendor, product and/or service information, such as a vendor name, vendor contact information including, for example, a phone number, network address, mailing address or other, quantity information, cost, price, type of product, type of service, etc. Thus, when used to request or order information or make a purchase, the number transmitted in the signal may be used to access the related information stored in a database as will be explained in more detail herein.

Figure 2:
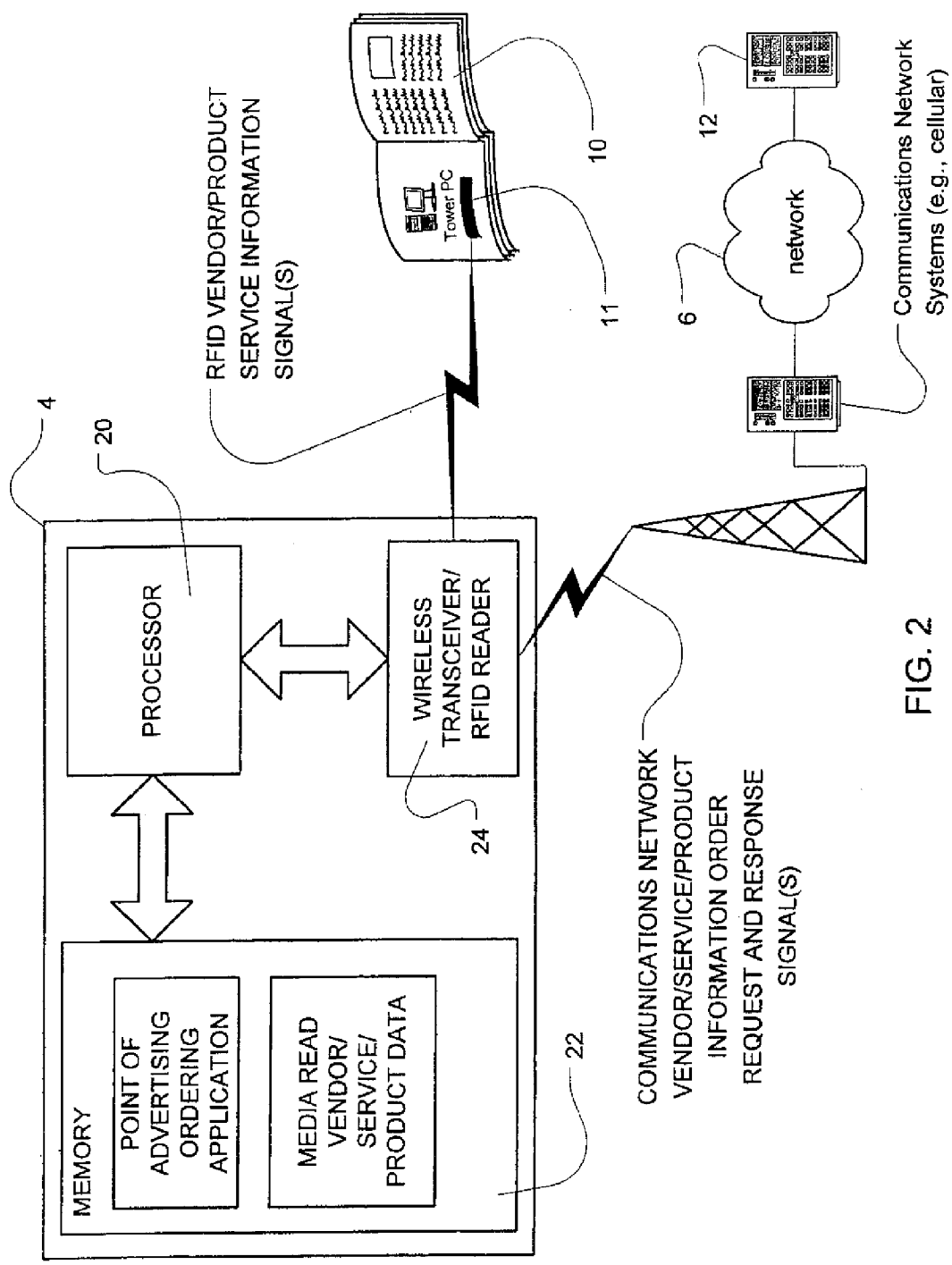
FIG. 2 is a representation of a preferred point of advertising ordering application in a wireless ordering device.
Figure 3:
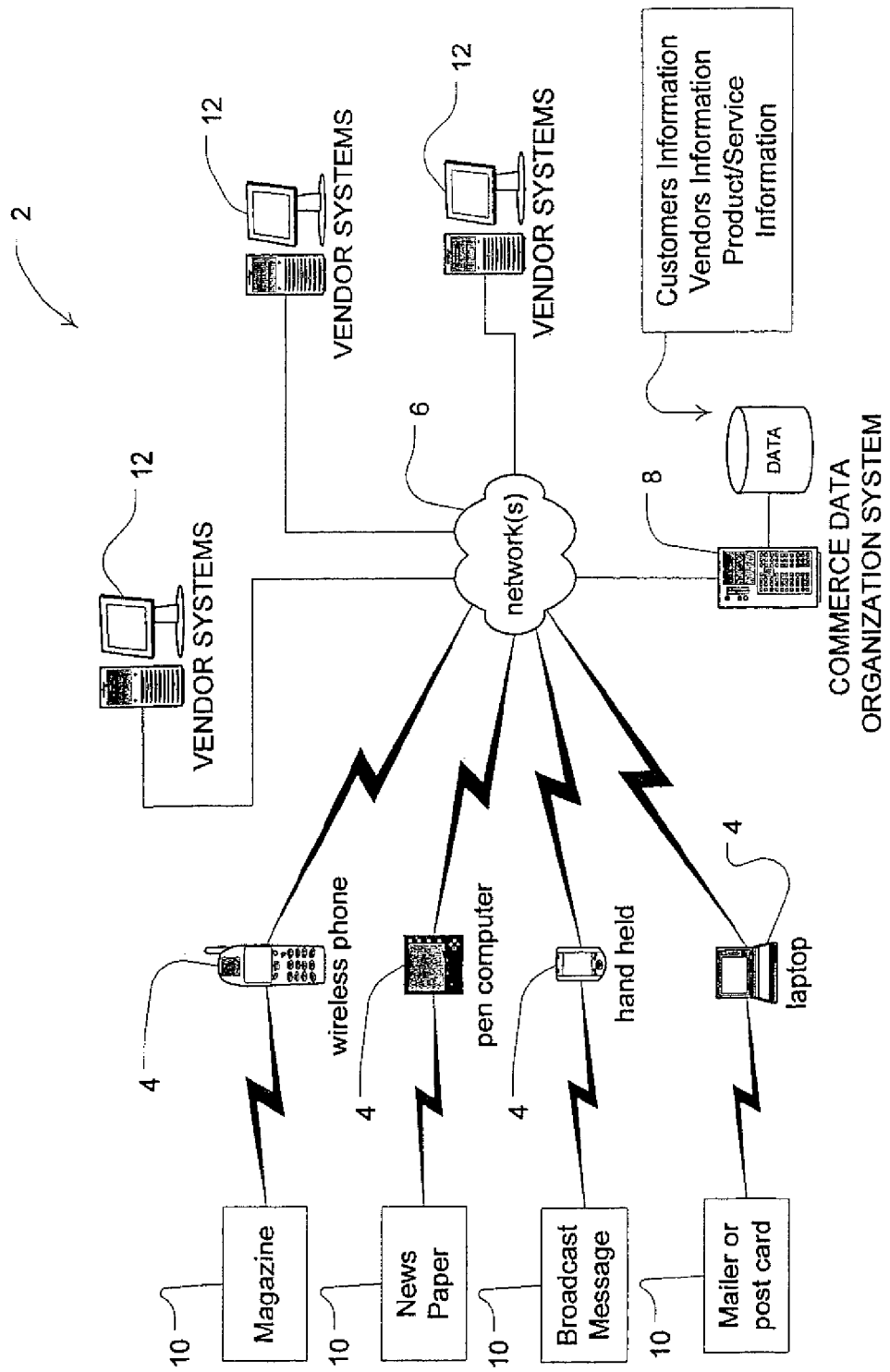
FIG. 3 is a network diagram of an example embodiment including preferred components of a wireless mass media commerce system of the invention including a point of advertising ordering device.

As illustrated in FIGS. 1 to 3, examples of the mass media publication containing RFID and other advertisement may be a magazine, news paper, periodical, mailer, post card, outdoor or out-of-home media, billboard, bus shelter poster board, car card, tent card, catalog or a broadcast message such as a radio or television communication, whether transmitted via wireless transmission (e.g., radio transmissions or satellite) and/or cable transmission in whole or in part. For example, a magazine may include one or more RFID tags with each associated with a particular product, service or vendor. Each tag may be located near a human perceivable advertisement in the magazine. In another example, a radio or television connected by cable, satellite or otherwise, may be equipped or attached with a re-programmable tag or device that may be changeable for re-transmitting different RFID's from the tag or device depending on the content of the broadcast signals received by the radio or television and the tag or device.

In general, the point of advertising ordering system 2 may also include commerce related systems such as one or more vendor systems 12. Generally, the vendor system 12 is accessible by the network 6 and may be associated with an advertisement contained in a mass media publication 10 as well as the associated commerce signal enabled by the mass media publication 10. It is preferred that the vendor system 12 be enabled for receiving or processing requests for vendor/product/service information and responding to them. Thus, in a typical arrangement, the commerce system 12 may electronically receive an order for more information or an actual purchase order over the network 6 and send back responses concerning these transactions in response to a transaction initiated by a consumer with a wireless ordering device 4. The vendor system would typically include one or more servers coupled by communications device(s) to the network 6 and would include application software for accessing information in a database associated with vendor products or services and communicating with systems over the network.

As illustrated in FIG. 3, the commerce system of the invention may also optionally include a commerce data organization system 14. The commerce data organization system can serve to organize transactions over the network based on vendor/product/service or other commerce facilitating signals from a mass media publication 10 of the invention. Generally, the commerce data organization system 14 may manage information associated with the commerce signals. Thus, a database or other storage structure of one or more servers of the commerce data organization system 14 may include vendor information including contact details for electronically accessing a vendor system 12 over a network. Similarly, such vendor information may include product and service description or details about a product or service that may be advertised in the wirelessly enabled mass media publication 10 and particularly associated with commerce signals transmittable from or in the mass media publication 10. Like the vendor servers, the commerce data organization system would typically include a communications device for communicating with other systems and devices over the network (6).

Such a commerce data organization system 14 may also be utilized to preserve and organize transaction details concerning requests for information or purchases (i.e., order information) based on requests generated by a wireless ordering device 4 with commerce signals emanating from the wirelessly enabled mass media publication 10. Thus, the system may track or maintain product availability from different vendors or different vendor's locations, customer purchases or information requests and buying habits, dates and times of such transactions, product/service options, payment methods etc. Such a system may even be utilized to maintain account information (e.g., credit or cash card numbers), shipping address information, etc. for purchases by consumers to minimize repeated entry of such data by the consumer with a wireless ordering device 10.

The commerce data organization system 14 may electronically act to arrange a purchase through the network 6 by communicating with another vendor system 12 in the event that an electronic purchase order is received from a wireless ordering device 4. Alternatively, such a purchase may be placed between the wireless ordering device 4 and the vendor system 12, while the commerce data organization system serves to preserve data of such transactions and/or provide access to data for such transactions based on requests with or for information received from either the vendor system 12 or wireless ordering device 4. Optionally, the commerce data organization system may also act as a vendor system 12.

As illustrated in more detail in FIG. 2, the wireless ordering device 4 generally includes a processor 20 and memory 22 with processor control instructions and/or other microcontroller or other application specific electronic control circuitry. The ordering device also includes one or more wireless transceiver circuit(s) 24. Such circuit(s) may serve as the communications mechanism for purposes of ordering information or products and services from one or more vendors as well as the reader mechanism for determining vendor, product or service information from a mass media publication 4. Such transceiver circuit(s) 24 may be incorporated into the wireless ordering device 4 or attachable or insertable as expansion modules, cards or components of such a device, for example, by coupling with or into a wireless phone, PDA or laptop. Preferably, such transceiver circuit(s) 24 is/are incorporated to permit the wireless ordering device 4 to serve with the communications mechanism and reader mechanism as a compact unit for hand-held operation.

Consistent with the mass media publication's 10 incorporation of RFID information, the reader mechanism is at least a wireless reader capable of or configured for receiving and decoding vendor, service or product identification information from the mass media publication. Thus, the wireless ordering device 4 may include an RFID reader for receiving wireless signals from a mass media publication 10 utilizing RFID technology. Optionally, in the case of passive RFID technology, the reader mechanism may be equipped to activate a transmission of RFID information from the mass media publication 10 by transmitting signals to an RFID tag of the mass media publication 10, for example, to power the RFID tag to transmit RFID information to the reader mechanism.

Preferably, such components of the wireless ordering device 4 are used in conjunction with implementing functionality of a point of advertising ordering application of the wireless ordering device 4. One such preferred methodology of such an application is illustrated in the flow chart of FIG. 4.

Figure 4:
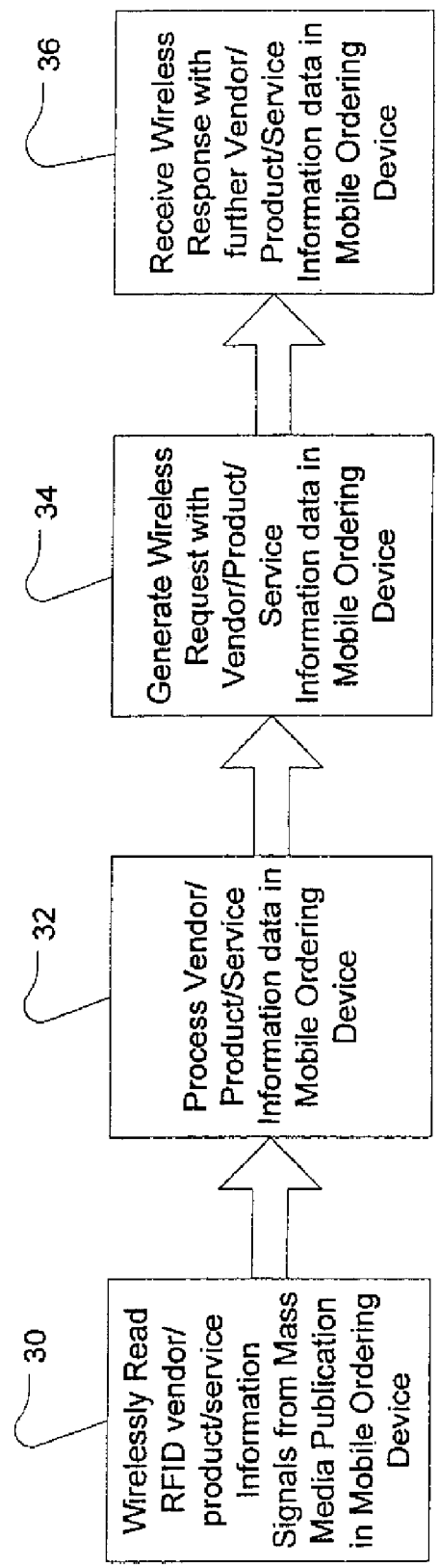
FIG. 4 is a flow chart of preferred steps for achieving a wireless mass media commerce system of the invention.

Generally, a consumer with a wireless ordering device 4 may review a mass media publication 10, such as the magazine or periodical publication illustrated in FIG. 2 or billboard of FIG. 1. As previously discussed, the mass media publication 10 includes a mechanism for transmitting commerce related signals such as RFID information. As illustrated in FIG. 4, in a reading step 30, the RFID information is received from the mass media publication preferably by wireless communication, which may be initiated by an input command of the consumer on the wireless ordering device 4. In a processing step 32, the point of advertising ordering application 26 will then process the read RFID information on the wireless ordering device 4 depending on input of the consumer. Thus, a consumer may input into the wireless ordering device 4 that more information about a vendor, product or service perceived in an advertisement of the mass media publication 10 should be requested. Optionally, such input may indicate a request to purchase that which is being perceived by the consumer in the advertisement of the mass media publication.

Once the device reads the RFID information, in a generating step 34, the point of advertising ordering application controls the wireless ordering device 4 to generate a wireless request that includes the RFID information. The request is preferably transmitted from the wireless ordering device 4 over the network(s) 6 to a vendor system 12 and/or the commerce data organization system 14 as previously described. Such a transmitted request may include a user identification associated with a particular consumer or a particular wireless ordering device 4. Additional transmitted request information may include password or pass code, form of payment information, media location or media description (e.g., identifiers describing the mass media publication from which the commerce signal is received.) This information may be coded (e.g., a number being associated with a name) such that it will be recognized by the vendor system 12 and/or the commerce data organization system 14 upon access of their database or other data storage structures.

In return from the vendor system 12 and/or commerce data organization system 14, the wireless ordering device 4 will receive vendor, product or service information associated with the commerce signal read by the wireless ordering device advertised in the mass media publication 10. Thus, the consumer may, for example, learn by display of information on the wireless ordering device 4, additional information about an advertised product or confirm a purchase from a vendor. For example, the vendor system 12 and/or the commerce data organization system 14 may generate an email confirmation receivable by the wireless ordering device 4.

While the above process has been described by a single request and response between the wireless ordering device 10 and the vendor system 12 and/or the commerce data organization system 14, multiple electronic requests and responses between these systems/devices may be implemented to accomplish transactions contemplated by the system. For example, additional requests and/or responses may be transmitted to confirm that a consumer will proceed with a particular purchase so that the details of the purchase may be confirmed before purchase by the consumer such as reviewing shipping details, product quantity, price or other details etc. that may be related to such transactions.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A system for processing a wireless order from a vendor over a network based on a broadcast publication containing a human-perceptible advertisement for advertising to consumers a product or service offered by the vendor, the broadcast publication associated with at least one radio frequency identification (RFID) tag of a television receiver, the at least one RFID tag being configured to transmit a wireless identification transmission signal representing information pertaining to the product or service offered by the vendor comprising:

mobile ordering device of a human consumer who perceives the human-perceptible advertisement of the broadcast publication received by the television receiver, the mobile ordering device comprising a radio frequency identification reader to receive from the at least one RFID tag of the television receiver the wireless identification transmission signal corresponding to the broadcast publication and representing information pertaining to the product or service offered by the vendor, the mobile ordering device further configured to accept input from a consumer, generate an electronic order request with the received information from the wireless identification transmission signal and communicate the request to and receive a response from a vendor system across a network;

the mobile ordering device in communication with the vendor system, the vendor system for receiving and processing the request of the mobile ordering device across the network, and responding to the request by sending information to the mobile ordering device via the network, the information associated with the wireless identification transmission signal.

2. The system of claim 1 wherein the at least one radio frequency identification tag of the television receiver is configured to transmit, as the wireless identification transmission signal, a wireless identification transmission signal representing (i) information pertaining to the product or service offered by the vendor and (ii) information pertaining to the vendor.

3. The system of claim 1 wherein the at least one radio frequency identification tag is configured to transmit different wireless identification transmission signals depending on the content of the broadcast publication signals received by the television receiver.

4. The system of claim 1 wherein the broadcast publication comprises a broadcast message transmitted by satellite to the television receiver.

5. The system of claim 1 wherein the broadcast publication comprises a broadcast message transmitted by cable to the television receiver.

6. The system of claim 1 wherein the network comprises a general packet radio service network.

7. The system of claim 1 wherein the network comprises a wireless fidelity network.

8. The system of claim 1 wherein the mobile ordering device comprises a cellular phone.

9. A method for taking a wireless order from a consumer to a vendor over a network with a broadcast publication containing a human-perceptible advertisement for advertising to consumers a service or product offered by the vendor, the broadcast publication associated with a wireless transmission identification signal representing information pertaining to the service or product offered by the vendor, the wireless transmission identification signal being transmittable from at least one RFID tag of a television receiver receiving the broadcast publication having the human-perceptible advertisement, the method comprising:

receiving a consumer order request to a vendor from a mobile ordering device via the network with electronic information comprising the information representing information pertaining to the service or product offered by the vendor received by an RFID reader device by way of the wireless transmission identification signal from a television;

generating a response to the consumer order request, the response being associated with the received information pertaining to the product or service offered by the vendor at the mobile ordering device; and sending the response to the consumer request by providing, to the mobile ordering device via the network, the information associated with the information pertaining to the service or product offered by the vendor as read from the radio frequency identifier tag.

10. The method of claim 9 wherein initiating transmission of the wireless identification transmission signal comprises: initiating, from the at least one radio frequency identification tag with the transmitter of the mobile ordering device of the consumer who perceives the human-perceptible advertisement, transmission of the wireless transmission identification signal representing (i) information pertaining to the product or service offered by the vendor and (ii) information pertaining to the vendor.

11. The method of claim 9 wherein the broadcast publication comprises a broadcast message transmitted by satellite to the television receiver.

12. The method of claim 9 wherein the broadcast publication comprises a broadcast message transmitted by cable to the television receiver.

13. The method of claim 9 wherein the network comprises a general packet radio service network.

14. The method of claim 9 wherein the network comprises a wireless fidelity network.

15. The method of claim 9 wherein the at least one radio frequency identification tag is configured to transmit different wireless identification transmission signals depending on the content of the broadcast publication signals received by the television receiver.

16. The method of claim 9 wherein the mobile ordering device comprises a cellular phone.

17. A method for taking a wireless order from a consumer by a vendor over a network based on a broadcast publication to a television receiver, the broadcast publication containing a human-perceptible advertisement for advertising to consumers a product or service offered by the vendor, the broadcast publication being associated with at least one radio frequency identifier tag of a television receiver, the at least one radio frequency identifier tag having information pertaining to the product or service offered by the vendor, and the at least one radio frequency identifier tag being readable by a radio frequency identifier reader of a mobile ordering device of a consumer who perceives the human-perceptible advertisement comprising:

configuring a vendor system on a network to receive and respond to an electronic order from the mobile ordering device across a network, the electronic order comprising the information pertaining to the product or service offered by the vendor as read by the radio frequency identifier reader from the at least one radio frequency identifier tag of the television receiver, the vendor system including information associated with the information pertaining to the service or product offered by the vendor as read by the radio frequency identifier reader from the at least one radio frequency identifier tag; and responding to the orders from the consumer by providing, to the mobile ordering device via the network, the information associated with the information pertaining to the service or product offered by the vendor as read by the radio frequency identifier reader from the at least one radio frequency identifier tag.

18. The method of claim 17 wherein the at least one radio frequency identification tag, when read by the radio frequency identifier reader, provides (i) information pertaining to the product or service offered by the vendor and (ii) information pertaining to the vendor.

19. The method of claim 17 wherein the at least one radio frequency identification tag is configured to transmit different wireless identification transmission signals depending on the content of the broadcast publication signals received by the television receiver.

20. The method of claim 17 wherein the broadcast publication comprises a broadcast message transmitted by satellite to the television receiver.

21. The method of claim 17 wherein the broadcast publication comprises a broadcast message transmitted by cable to the television receiver.

22. The method of claim 17 wherein the network comprises a general packet radio service network.

23. The method of claim 17 wherein the network comprises a wireless fidelity network.

24. The method of claim 17 wherein the mobile ordering device comprises a cellular phone.

25. A system for processing a wireless order from a vendor over a network based from a broadcast publication containing a human-perceptible advertisement for advertising to consumers a product or service offered by the vendor, the broadcast publication associated with at least one radio frequency identification (RFID) transponder of a television receiver, the at least one RFID transponder being configured to transmit a wireless identification transmission signal representing information pertaining to the product or service offered by the vendor, the system comprising:

a television receiver, the television receiver comprising the radio frequency identification transponder, the television receiver configured to receive the broadcast publication containing the human-perceptible advertisement, the television receiver further configured to transmit the wireless identification transmission signal corresponding to the broadcast publication and representing information pertaining to the product or service offered by the vendor to a mobile ordering device of a human consumer who perceives the human-perceptible advertisement of the broadcast publication, the mobile ordering device comprising a radio frequency identification reader to receive from the at least one RFID transponder of the television receiver the wireless identification transmission signal corresponding to the broadcast publication and representing information pertaining to the product or service offered by the vendor, the mobile ordering device further configured to accept input from a consumer, generate an electronic order request with the received information from the wireless identification transmission signal and communicate the request to and receive a response from a vendor system across a network, the mobile ordering device for communication with the vendor system, the vendor system for receiving and processing the request of the mobile ordering device across the network, and responding to the request by sending information to the mobile ordering device via the network, the information associated with the wireless identification transmission signal.

26. The system of claim 25 further comprising at least one vendor system for receiving and processing the request of the mobile ordering device across the network, and responding to the request by sending information to the mobile ordering device via the network, the information associated with the wireless identification transmission signal.

27. The system of claim 25 further comprising a commerce data organization system, the commerce data organizing system being configured to track information requests based on wireless identification transmission signals associated with broadcast publications.

28. The system of claim 25 wherein the at least one radio frequency identification transponder of the television is configured to transmit different wireless identification transmission signals depending on the content of the broadcast publication signals received by the television receiver.

29. The system of claim 25 wherein the mobile ordering device comprises a cellular phone.

* * * * *